(12) United States Patent
Lang et al.

(10) Patent No.: US 11,111,955 B2
(45) Date of Patent: Sep. 7, 2021

(54) METHOD FOR FIXING A FIBER HAVING A FIBER BRAGG GRATING SENSOR SEGMENT ONTO A COMPONENT AND BEARING DEVICE WITH SUCH A FIBER

(71) Applicant: Aktiebolaget SKF, Gothenburg (SE)

(72) Inventors: Defeng Lang, Delft (NL); Ben Koperdraad, IJsselstein (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/517,810

(22) Filed: Jul. 22, 2019

(65) Prior Publication Data

US 2020/0063794 A1    Feb. 27, 2020

(30) Foreign Application Priority Data

Aug. 22, 2018    (DE) .......................... 102018214195.9

(51) Int. Cl.
| | |
|---|---|
| *F16C 41/00* | (2006.01) |
| *F16C 19/52* | (2006.01) |
| *G01L 1/24* | (2006.01) |
| *G01D 5/353* | (2006.01) |
| *G01B 11/16* | (2006.01) |
| *G01L 5/00* | (2006.01) |
| *F16C 33/58* | (2006.01) |

(52) U.S. Cl.
CPC .......... *F16C 19/522* (2013.01); *F16C 19/525* (2013.01); *F16C 33/583* (2013.01); *F16C 41/00* (2013.01); *G01B 11/165* (2013.01); *G01D 5/35316* (2013.01); *G01L 1/246* (2013.01); *G01L 5/0009* (2013.01); *F16C 33/586* (2013.01); *F16C 2233/00* (2013.01)

(58) Field of Classification Search
CPC ...... F16C 19/522; F16C 19/525; F16C 41/00; F16C 2233/00; G01B 11/165; G01D 5/35316; G01L 5/0009; G01L 1/246
See application file for complete search history.

(56) References Cited

U.S. PATENT DOCUMENTS

| | | | | |
|---|---|---|---|---|
| 6,384,404 | B1* | 5/2002 | Berg | ................. G01D 5/35383 |
| | | | | 250/227.16 |
| 9,546,689 | B2* | 1/2017 | Yang | ..................... C03C 27/046 |
| 2007/0107529 | A1* | 5/2007 | Maurin | .................. G01L 1/246 |
| | | | | 73/800 |

(Continued)

FOREIGN PATENT DOCUMENTS

| | | |
|---|---|---|
| DE | 102015208444 A1 | 12/2016 |
| WO | 2011/066926 A1 | 6/2011 |

(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A method for fixing a fiber having a fiber Bragg grating sensor segment onto a component configured to undergo changes in strain and/or temperature. The method providing the steps of stretching at least a section of the fiber including the fiber Bragg grating sensor segment by a defined and calibrated preload into a preloaded condition, fixing the section of the fiber including the fiber Bragg grating sensor segment being in the preloaded condition on a carrier element, and fixing the carrier element onto the component, as well as a bearing device with such a fiber.

13 Claims, 1 Drawing Sheet

(56) References Cited

U.S. PATENT DOCUMENTS

2007/0193362 A1* 8/2007 Ferguson ............... G01B 11/18
73/800
2016/0363493 A1* 12/2016 Xia ................... G02B 6/02076

FOREIGN PATENT DOCUMENTS

| WO | 2011/066927 A1 | 6/2011 |
| WO | 2011/066928 A1 | 6/2011 |
| WO | 2013/186256 A1 | 12/2013 |
| WO | 2013/186258 A1 | 12/2013 |
| WO | 2013/186354 A1 | 12/2013 |
| WO | 2014/090332 A1 | 6/2014 |
| WO | 2016/096031 A1 | 6/2016 |

* cited by examiner

METHOD FOR FIXING A FIBER HAVING A FIBER BRAGG GRATING SENSOR SEGMENT ONTO A COMPONENT AND BEARING DEVICE WITH SUCH A FIBER

CROSS-REFERENCE TO RELATED APPLICATIONS

This application claims priority to German patent application no. 102018214195.9 filed on Aug. 22, 2018, the contents of which are fully incorporated herein by reference.

FIELD OF THE INVENTION

The present invention relates to a method for fixing a fiber having a fiber Bragg grating (FBG) sensor segment onto a component designed to undergo changes in strain and/or temperature. Further, the invention relates to a bearing device having a bearing ring, a fiber having an FBG sensor segment and a carrier element.

BACKGROUND OF THE INVENTION

It is known to equip a bearing ring with a glass fiber element having FBG sensor segments to allow measurements of changes in physical parameters such as temperature and strain. The bearing ring shows an outer surface having a groove in which the glass fiber element is arranged. The quality of the connection, in particular in terms of position accuracy and service life, between the FBG sensor segments and the bearing ring is crucial to the accuracy and the repeatability of the measurements in industrial applications.

It is known to bond the FBG sensor segments under some preload directly onto the bearing ring using an adhesive. Here, however, it is difficult to position the FBG sensor segments precisely on the bearing ring. Further, changes in temperature of more than 100 K typically occur during the bonding process; therefore, it is difficult to keep the level of the preload constant during the bonding process. As a consequence of unprecise positions and/or undefined preloads of the FBG sensor segments, the achievable accuracy of measurements carried out under use of the FBG sensor segments is limited, especially regarding long term applications and/or applications in large temperature ranges. Further the process of manufacture is laborious.

BRIEF SUMMARY OF THE INVENTION

The object of the present invention is to provide an improved method for fixing a fiber having at least one FBG sensor segment onto a component designed to undergo changes in strain and/or temperature, in particular onto a bearing ring. Especially, it is an object to improve the method regarding the achievable accuracy of a measurement performed using the FBG sensor segment. It is a further object of the present invention to improve the method with respect to the expenditure in manufacturing. Further, it is an object of the present invention to provide an improved bearing device analogously.

In accordance with the present invention, there is provided a method for fixing a fiber having an FBG sensor segment onto a component designed to undergo changes in strain and/or temperature. The method comprises the following steps: i) stretching at least a section of the fiber including the FBG sensor segment by a defined and calibrated preload into a preloaded condition, ii) fixing the section of the fiber including the FBG sensor segment being in the preloaded condition on a carrier element and iii) fixing the carrier element onto the component.

The fixation of the section of the fiber including the FBG sensor segment on the carrier element in step ii) can be carried out under advantageous spatial surrounding conditions. Consequently, holding the defined preload during the fixation process can be controlled particularly well. Further, in step iii), the carrier element can be precisely positioned relative to the component. Consequently, a precise positioning of the FBG sensor segment vis-à-vis the component can be realized advantageously. As a result, accuracy in measurements carried out by use of the FBG sensor segment can be improved. Further, the expenditure in manufacturing is reduced.

The method is especially suited if the component is a bearing ring.

In step ii), the fixing of the section of the fiber including the FBG sensor segment on the carrier element is carried out preferably by gluing and/or mechanical interlocking and/or fitting. This enables a comparatively simple fixing or bonding process.

In step iii) the fixing of the carrier element onto the component is carried out preferably by gluing or welding. This makes it possible to position the carrier element relative to the component very precisely. Thereby it is particularly advantageous if the material of the carrier element is made from the same basic material or has a coating/finish of the same basic material as the component, e.g. both are made from metal or plastic. Thereby, the fixing procedure is facilitated and the transfer of loads is ensured.

According to a further aspect of the invention, there is provided a bearing device, comprising a bearing ring, a fiber having at least one FBG sensor segment and a carrier element. At least a section of the fiber including the at least one FBG sensor segment is fixed in a de-fined and preloaded condition on the carrier element and the carrier element is fixed onto the bearing ring. The bearing device shows especially high-quality performance regarding the accuracy of measurements carried out using the FBG sensor segment. It goes without saying that each fiber may have a plurality of FBG sensor segments, which encompass the bearing ring at least partially.

Preferably, the bearing ring shows a groove, wherein the carrier element is accommodated at least partly in the groove. This is advantageous regarding a reliable contact between the carrier element and the bearing ring. It is further advantageous, because it allows to locate the FBG sensor segment next to an area of the bearing ring which is particular sensitive regarding the physical parameters to be measured.

Preferably, the carrier element is a solid element, in particular made from a metal material. This is advantageous regarding the transmission of heat and/or mechanical energy from the bearing ring to the FBG sensor segment.

Preferably, the carrier element is shaped essentially like a bar or a thin plate. This makes it possible to locate the fiber very close to the surface of the bearing ring. This is in particular as well advantageous with respect to the transmission of thermal and/or mechanical energy from the bearing ring via the carrier element to the FBG sensor segment.

Preferably, the carrier element shows a concave surface corresponding to a convex outer surface of the bearing ring, wherein the carrier element is fixed with its concave surface onto the convex outer surface of the bearing ring. This enables a particular high-quality contact between the bearing ring and the carrier element and consequently a particular good transmission of thermal and/or mechanical energy.

Preferably, the fiber further has at least on more section including at least one further FBG sensor segment which is fixed to at least one further carrier element. By using two separate carrier elements, the plurality of FBG sensor segments are mechanically decoupled from each other. Thereby, a further increase in the accuracy of the measurements can be achieved.

BRIEF DESCRIPTION OF THE SEVERAL VIEWS OF THE DRAWING

Further benefits and advantages of the present invention will become apparent from the following detailed description with appropriate reference to the accompanying drawings.

In the drawings.

DETAILED DESCRIPTION OF THE INVENTION

Figure 1:
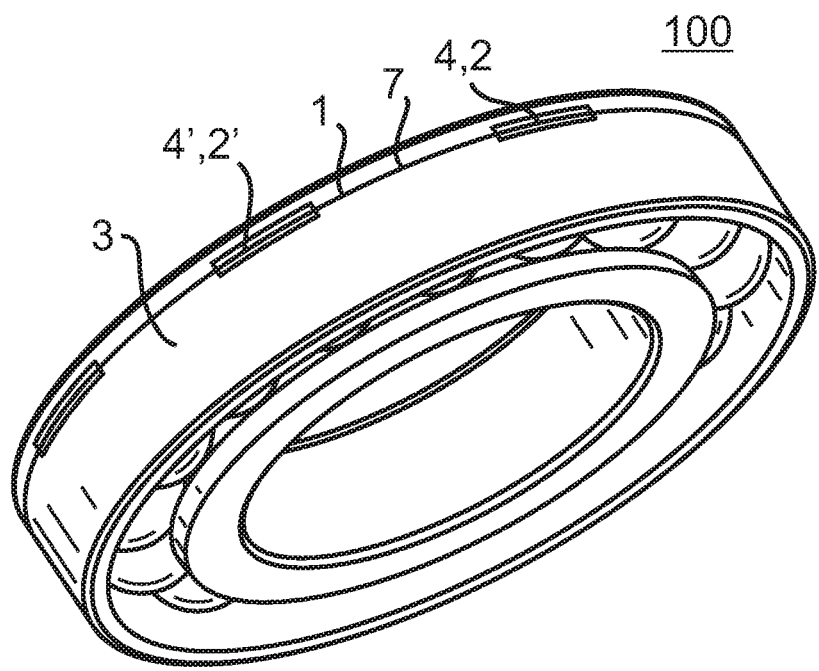
FIG. 1 is a perspective view of a bearing device in accordance with a preferred embodiment of the invention.

FIG. 1 shows a bearing device 100 in accordance with a preferred embodiment of the invention. The bearing device 100 comprises a bearing ring 3, a fiber 1 having an FBG sensor segment 2 and a carrier element 4. The fiber 1 is e. g. a glass fiber. The bearing ring 3 is e. g. an outer bearing ring, in particular a non-rotating ring. The fiber 1 with the FBG sensor segment 2 is designed to allow measurements of changes in physical parameters such as temperature and/or strain, as—in principle—known as such. The bearing ring 3 is preferably made of a metal material.

Figure 3:
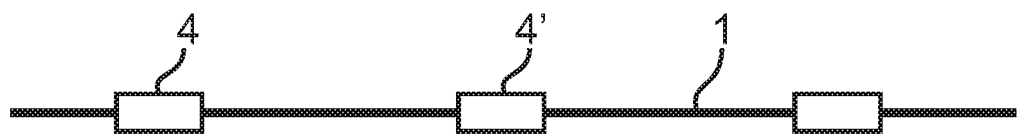
FIG. 3 is a schematic view of the fiber and several carrier elements.
Figure 2:
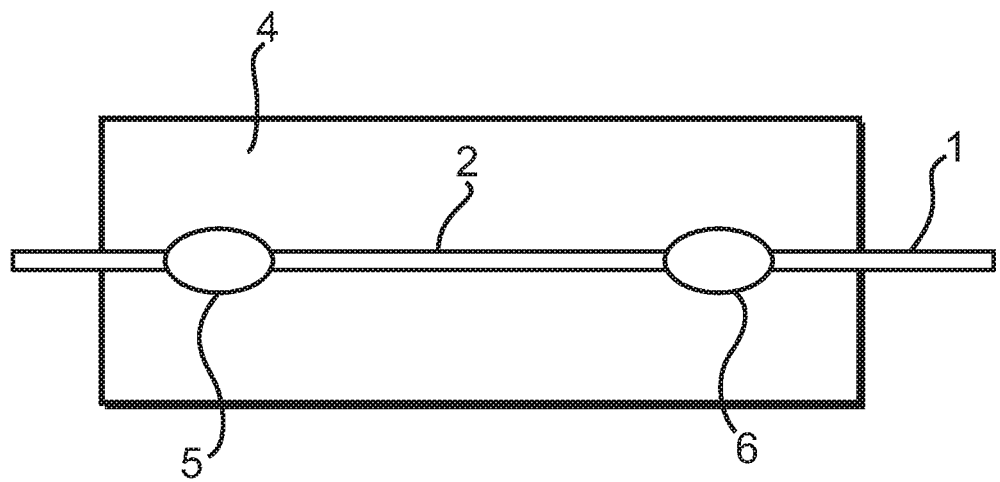
FIG. 2 is a schematic view of a carrier element and a section of a fiber having an FBG sensor segment fixed thereto.

According to the invention, at least a section of the fiber 1 including the FBG sensor segment 2—as shown in FIG. 2—is fixed in a defined and preloaded condition to the carrier element 4 and the carrier element 4 is fixed onto the bearing ring 3. The fixation of the section of the fiber 1 including the FBG sensor segment 2 to the carrier element 4 may be carried out by gluing. Alternatively or additionally, a mechanical interlocking and/or fritting may be used.

Preferably, as sketched in FIG. 2, the section of the fiber 1 including the FBG sensor segment 2 includes at least one FBG sensor segment 2. Further advantageously, the fixation of the section of the fiber 1 on the carrier element 4 comprises at least two fixation points 5, 6 embracing each the FBG sensor segment 2 in between.

The length of the FBG is as short as possible, particularly less than 2 cm, preferably less than 10 mm. It has been shown that a length of 2 mm results in easily picked wavelength peaks.

Preferably, the bearing ring 3 shows a cylindrical outer surface, wherein the carrier element 4 is fixed on the outer surface. Advantageously, a groove 7 is provided at the outer surface of the bearing ring 3, in which the carrier element 4 is accommodated at least partly.

The carrier element 4 is fixed onto the component 3 e. g. by gluing or welding. Fixing the carrier element 4 to the bearing ring 3 by welding or by any other matured metal to metal adhesion method is in particular advantageous regarding long term stability.

Thereby it should be noted that according to the invention, the fiber with the FBG sensor is fixed to the bearing ring 3 which undergoes changes in strain and/or temperature according to the following steps: i) stretching at least a section of the fiber 1 including the FBG sensor segment 2 by a defined and calibrated preload into a preloaded condition, ii) fixing the section of the fiber 1 including the FBG sensor segment 2 being in the preloaded condition on the carrier element 4, iii) fixing the carrier element 4 onto the bearing ring 3.

Due to significantly better spatial conditions, it is much easier to fix the section of the fiber 1 including the FBG sensor segment 2 under the defined preload condition on the carrier element 4 than directly into the groove 7. Accordingly, using the carrier element 4 is advantageous since a defined preload is a crucial factor regarding the achievable accuracy of the measurement.

The process of bonding or fixing the section of the fiber 1 including the FBG sensor segment 2 to the carrier element 4 is simpler compared to the corresponding bonding process according to the state of art; therefore, the expenditure in manufacturing the device is reduced.

Preferably, the carrier element 4 is a solid element, e. g. made from a metal material. Further preferably, the carrier element 4 is designed as an integral or a one-piece element. Thereby, an undesirable modification of thermal or mechanical energy by the carrier element 4 during the transmission from the bearing ring 3 to the FBG sensor segment 2 can be eliminated or at least be kept marginal. For the same purpose, the carrier element 4 is further advantageously shaped essentially like a bar or like a thin plate.

A particular good contact between the carrier element 4 and a convex outer surface of the bearing ring 3 such as the cylindrical outer surface can be realized if the carrier element 4 shows a concave surface corresponding to the convex outer surface of the bearing ring 3 and the carrier element 4 is fixed with its concave surface onto the convex outer surface of the bearing ring 3.

Preferably, the fiber 1 further has at least one more section including a further FBG sensor segment 2' which is fixed to the carrier element 4 or to at further carrier element 4' in the same way as mentioned above and wherein the at further carrier element 4' is fixed onto the bearing ring 3 in the same way as the first mentioned carrier element 4 onto the bearing ring 3.

By using two separate carrier elements 4, 4', the plurality of FBG sensor segments 2, 2' are mechanically decoupled from each other. This makes it possible to position the carrier elements 4, 4' particularly precise onto the bearing ring 3, especially regarding the angular direction with respect to a main axis of the bearing device 100, i. e. along the circumference of the cylindrical outer surface of the bearing ring 3, but also regarding the corresponding axial direction.

Preferably, the carrier elements 4, 4' are designed analogously or identical in construction. This is advantageous regarding manufacturing.

The advantages gained by the technical features of the invention in particular comprise:

The preload of the FBG sensor segment can be better controlled.

Controlling the positioning accuracy of the FBG sensor segments is improved; especially, the radial (angular) positioning of the FBG sensor segments are decoupled from each other.

Extra length of fiber can be defined between each of the FBG sensor segments; therefore, a single size of sensing string can fit multiple sizes of different bearing rings.

The carrier elements can be fixed to the bearing ring by welding or by any other metal to metal adhesion method. This enables better long-term stability.

The process of bonding a section of the fiber with an FBG sensor segment is simplified.

Although the invention has been explained in relation to its preferred embodiments as mentioned above, it is to be understood that many other possible modifications and variations can be made without departing from the scope of the present invention. It is, therefore, contemplated that the appended claims will cover such modifications and variations that fall within the true scope of the invention.

REFERENCE NUMERALS 100 bearing device
1 fiber
2, 2' FBG sensor element
3 bearing ring
4, 4' carrier element
5, 6 fixation point
7 groove

What is claimed is:

1. A method for fixing a fiber having a plurality of fiber Bragg grating sensor segments onto a bearing configured to undergo changes in strain and/or temperature, comprising the steps of:
   i) providing the bearing which has a circumferential outer surface, the circumferential outer surface defining a groove therearound,
   ii) stretching each of a plurality of sections of the fiber such that each of the plurality of sections forms a separate one of the plurality of fiber Bragg grating sensor segments by a defined and calibrated preload into a preloaded condition,
   iii) fixing each of the plurality of sections of the fiber while in the preloaded condition on a separate one of a plurality of carrier elements such that each of the plurality of fiber Bragg grating sensor segments is on a separate carrier element, each of the plurality of carrier elements comprising a one-piece element of uniform plate shape as taken along the circumferential outer surface of the bearing,
   iv) fixing each of the plurality of carrier elements onto the bearing in a spaced apart fashion therealong such that each of the plurality of carrier elements is separate from the other of the plurality of carrier elements, each of the plurality of carrier elements having a concave inner surface located radially inwardly from the circumferential outer surface of the bearing such that each of the plurality of carrier elements is at least partially located within the groove.

2. The method according to claim 1, wherein in step iii) the fixing of each of the plurality of sections of the fiber on one of the plurality of carrier elements is carried out by gluing and/or mechanical interlocking and/or fitting and/or wherein in step iv) the fixing of each of the plurality of carrier elements onto the bearing is carried out by gluing or welding.

3. The method according to claim 1, wherein in step iii) the fixing of each of the plurality of sections of the fiber while in the preloaded condition on a separate one of the plurality of carrier elements further comprises each of the plurality of carrier elements being made from a metal material.

4. The method according to claim 1, wherein in step iii) the fixing of each each of the plurality of sections of the fiber while in the preloaded condition on a separate one of the plurality of carrier elements further comprises each of the plurality of carrier elements having, when viewed in cross section, a rectilinear shape.

5. The method according to claim 1, wherein in step iv) the fixing of each of the plurality of carrier elements onto the bearing further comprises fixing a concave surface of each of the plurality of carrier elements to a convex outer surface of the bearing.

6. The method according to claim 1, wherein in step ii) the stretching of each of the plurality of sections of the fiber further comprises a length of each of the plurality of fiber Bragg grating sensor segments being less than ten millimeters (10 mm).

7. The method according to claim 1, wherein in step ii) the stretching of each of the plurality of sections of the fiber further comprises a length of each of the plurality of fiber Bragg grating sensor segments being two millimeters (2 mm).

8. A bearing arrangement comprising:
   a bearing ring comprising a circumferential outer surface, the circumferential outer surface defining a groove therearound, and
   a sensor arrangement,
   wherein the sensor arrangement includes
      a fiber having a plurality of fiber sections each including one of a plurality of fiber Bragg grating sensor segments,
      a plurality of carrier elements, each of the plurality of carrier elements comprising a one-piece element of uniform plate shape as taken along the circumferential outer surface of the bearing ring, and
      wherein each of the plurality of fiber sections is fixed in a defined and preloaded condition on a separate one of the plurality of carrier elements,
   wherein the sensor arrangement is fixed to the bearing ring by fixing each of the plurality of carrier elements onto the bearing ring,
   wherein each of the plurality of carrier elements has a concave inner surface located radially inwardly from the circumferential outer surface of the bearing ring such that each of the plurality of carrier elements is at least partially located within the groove, and
   wherein each of the plurality of carrier elements is discretely spaced such that each of the plurality of fiber Bragg grating sensor segments is on a separate one of the plurality of carrier elements and such that each of the plurality of carrier elements is separate from the other of the plurality of carrier elements.

9. The bearing arrangement according to claim 8, wherein each of the plurality of carrier elements is made from a metal material.

10. The bearing arrangement according to claim 8, wherein each of the plurality of carrier elements has, when viewed in cross section, a rectilinear shape.

11. The bearing arrangement according to claim 8, wherein each of the plurality of carrier elements provides a concave surface corresponding to a convex outer surface of the bearing ring, wherein each of the plurality of carrier elements is fixed with its concave surface onto the convex outer surface of the bearing ring.

12. The bearing arrangement according to claim 8, wherein a length of each of the plurality of fiber Bragg grating sensor segments is less than ten millimeters (10 mm).

13. The bearing arrangement according to claim 12, wherein the length of each of the plurality of fiber Bragg grating sensor segments is two millimeters (2 mm).

* * * * *